(12) United States Patent
Tonucci

(10) Patent No.: US 7,808,722 B2
(45) Date of Patent: Oct. 5, 2010

(54) SYSTEM AND METHOD FOR INDUCING FAR FIELD TRANSPARENCY WITH NEGATIVE INDEX MATERIALS

(75) Inventor: Ronald J Tonucci, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 152 days.

(21) Appl. No.: 12/239,313

(22) Filed: Sep. 26, 2008

(65) Prior Publication Data
US 2010/0020415 A1    Jan. 28, 2010

Related U.S. Application Data

(60) Provisional application No. 61/083,970, filed on Jul. 28, 2008.

(51) Int. Cl.
G02B 13/18    (2006.01)
G02B 27/30    (2006.01)

(52) U.S. Cl. .................. 359/717; 359/641; 359/722
(58) Field of Classification Search ............... 359/642, 359/641, 717, 718, 793–795
See application file for complete search history.

(56) References Cited

U.S. PATENT DOCUMENTS

| | | | |
|---|---|---|---|
| 6,788,273 B1 | 9/2004 | Schultz et al. | |
| 6,791,432 B2 | 9/2004 | Smith et al. | |
| 7,643,227 B2 * | 1/2010 | Nishioka | 359/793 |
| 7,646,524 B2 | 1/2010 | Tonucci | |
| 7,683,444 B2 | 3/2010 | Tonucci | |
| 2005/0200540 A1 | 9/2005 | Isaacs et al. | |
| 2006/0125681 A1 | 6/2006 | Smith et al. | |
| 2006/0238897 A1* | 10/2006 | Nishioka | 359/745 |
| 2007/0242360 A1 | 10/2007 | Rachford | |
| 2008/0024882 A1* | 1/2008 | Park et al. | 359/793 |
| 2009/0303578 A1* | 12/2009 | Engheta et al. | 359/342 |

OTHER PUBLICATIONS

Pendry, J. B., "Extremely Low Frequency Plasmons in Metallic Mesostructures", Physical Review Letters, vol. 76, No. 25, Jun. 1996, p. 4773-4776.

(Continued)

Primary Examiner—Jordan M. Schwartz
(74) Attorney, Agent, or Firm—Amy L. Ressing; Sally A. Ferrett (57) ABSTRACT

A lens system with a lens formed of a material having a negative index of refraction in an operational frequency range, a first surface of the material having a convex hyperbolic curvature, and a second surface of the material having a concave circular curvature. A lens system can include two of these lenses, arranged with the concave circular surfaces facing each other. Far field radiation arriving at the hyperbolic surface of the the first lens is refracted by the lens material toward the circular surface, out of the first lens in a direction parallel to the original radiation direction, and into the circular surface of the second lens, where it is refracted toward the hyperbolic surface of the second lens, and exits the second lens in a direction parallel to the original direction. The lens material can have a tunable or fixed negative refractive index and/or resonant frequency.

21 Claims, 8 Drawing Sheets

OTHER PUBLICATIONS

Pendry, J. B., "A Chiral Route to Negative Refraction", Science, vol. 306, Nov. 19, 2004, p. 1353-1355.

Shelby, R. A., "Experimental Verification of a Negative Index of Refraction", Science, vol. 292, Apr. 2001, p. 77-79.

Smith, D. R., "Composite Medium with Simultaneously Negative Value of Permeability and Permittivity", Phys. Rev. Lett., vol. 84, No. 18, May 1, 2000, p. 4184-4187.

Schurig, D., et al., "Metamaterial Electromagnetic Cloak at Microwave Frequencies", Science, vol. 314, pp. 977-979, Nov. 2006.

* cited by examiner

FIG. 1

PLATE
SUB-WAVELENGTH IMAGING

FIG. 2A

SPHERE

FIG. 2B

HYPERBOLIC

SYSTEM AND METHOD FOR INDUCING FAR FIELD TRANSPARENCY WITH NEGATIVE INDEX MATERIALS

CROSS REFERENCE TO RELATED APPLICATIONS

This application is a non-provisional under 35 U.S.C. §119 (e) of provisional application 61/083,970 filed on Jul. 28, 2008, the entire disclosure of which is incorporated herein by reference.

BACKGROUND OF THE INVENTION

1. Technical Field

This invention relates generally to the field of negative index of refraction materials and devices using these materials.

2. Description of Related Technology

Material containing an electric permittivity and magnetic permeability that are simultaneously negative for some frequency have a negative index of refraction, and have been called left handed material (LHM) or negative index material (NIM). V. G. Veselago, "The electrodynamics of substances with simultaneously negative values of $\epsilon$ and $\mu$", Soviet Phys. Usp. 10, 509 (1968), describes some characteristics of such a material, including a negative index of refraction and the ability to re-focus light passing through a thin slab composed of this material.

In the mid to late 1990s, John Pendry described some thin wires and split ring resonators (SRR) that paved the way to the fabrication of a meta-material that exhibited the negative index properties at microwave frequencies. J. B. Pendry, et. al., Phys. Rev. Lett., 76 4773 (1996) discloses that by using an array of thin metal wires, the plasma frequency of a metal could be shifted predictably to microwave frequencies. J. B. Pendry, et. al., IEEE Trans. Microw. Theory Techniques, 47 2075 (1999), discloses that by using an array of non-magnetic coupled metallic split ring resonators (SSR), the permeability of a metamaterial could be made to have negative values. This was demonstrated in the microwave by Smith in D. Smith, et. al., Phys. Rev. Lett., 84 4184 (2000), and more recently in the 100 terahertz range by Linden, in S. Linden, et. al., Science, 306, 1351 (2004). This structure uses split ring resonators and strip lines made of copper over circuit board material and is functional only at a single narrow band frequency, but demonstrated that microwave radiation passing through the wedged shaped NIM was bent through a large negative angle obeying Snell's Law, $n1 \sin \theta1 = n2 \sin \theta2$. In such negative index materials, since $n2$ is negative, $\sin \theta2$ is also negative, yielding a large change in angle. In these structures, the size and spacing of the individual components comprising the metamaterial are assumed much smaller than the wavelength of the resonant frequency of operation. They are also fixed frequency structures.

Negative index of refraction material properties are disclosed in C. G. Parazzoli, et. al., Phys. Rev. Lett., 90 107401 (2003) A. A. Houck, et. al., Phys. Rev. Lett., 90 137401 (2003).

Intrinsically photoconductive materials such as gallium arsenide and silicon have been used as high frequency substrates, with roll offs of greater than 50-100 GHz for Si and 1 THz for GaAs, as described in P. Abele, et. al., IEEE MTT-S Digest, 1681 (2002), D. W. Van der Weild, Appl. Phys. Lett. 65, 881 (1994), and U. Bhattacharya, et. al, IEEE Microwave and Guided Wave Letters 5, 50 (1995). Photoconductive bridging of strip line waveguides and resonators on Si have been observed at frequencies as high as 15 GHz with as little as 1 milliwatt per square mm CW illumination at 870 nm, as described in Y. Horri and M. Tsutsumi, Asia Pacific Microwave Conf., 561 (1997). More recently, an IR-defined, photoconductive microwave bowtie antenna in Si exhibited turn-on characteristics at 0.1 watts/cm2 at 970 nm with metallic (copper) like behavior at 1 watt/cm2 CW illumination between 1-18 GHz, as described in D. Liu, et. al., IEEE Photon. Technol. Lett. Vol. 10, page 716 (1998).

Some negative index of refraction composite materials are described in U.S. Patent Publication No. 20070242360 to Rachford and U.S. Pat. No. 7,253,696 to Krowne, the entire disclosures of which are incorporated by reference herein.

Tonucci discloses photoconductive metamaterials with positive and negative tunable index of refraction and frequency in U.S. patent application Ser. No. 11/559,535 and U.S. patent application Ser. No. 11/559,508, both of which are incorporated by reference in their entireties.

U.S. Pat. No. 6,788,273 to Schultz et al. discloses a compensated radome for eliminating bore sight errors, in which the radome has a layer of negative index of refraction material and a layer of positive index of refraction material.

SUMMARY

An aspect of the invention is directed to a lens system with a first lens and a second lens, the first lens formed of material having a negative index of refraction in an operational frequency range, the negative index of refraction material having a first surface having a convex hyperbolic curvature and a second surface having a concave hyperbolic curvature. The second lens is formed of material having a negative index of refraction in an operational frequency range, the negative index of refraction material having a first surface having a convex hyperbolic curvature and a second surface having a concave hyperbolic curvature. The concave hyperbolic surfaces of the first lens and the second lens face each other.

Another aspect of the invention is directed to a lens system comprising a lens formed of material having a negative index of refraction in an operational frequency range, the negative index of refraction material having a first surface having a convex hyperbolic curvature, and a second surface having a concave hyperbolic curvature, the first surface and the second surface having a common major axis. The system can also include a first receiver and a second receiver, with the first receiver positioned between the lens and the second receiver, wherein the lens bends electromagnetic radiation at frequencies within the operational frequency range around the first receiver and toward the second receiver, and transmits electromagnetic radiation at frequencies outside the operational frequency range to the first receiver.

Another aspect of the invention is directed to a lens system including a lens formed of material having a negative index of refraction in an operational frequency range, the negative index of refraction material having a convex first surface, and a concave second surface opposite the first surface, the negative index of refraction material in contact with a positive index of refraction environment of air, vacuum, or another gas, wherein farfield radiation within the operational frequency range that is incident on the convex surface is refracted toward the concave surface of the lens and is emitted by the concave surface of the lens in a direction parallel to the direction of the incident radiation.

Additional details of embodiments of the invention will be apparent from the drawing figures and detailed description.

DETAILED DESCRIPTION OF EMBODIMENTS OF THE INVENTION

Embodiments of the invention are directed to structures having or able to have a negative index of refraction shaped to guide electromagnetic radiation around a region or object.

Figure 1:
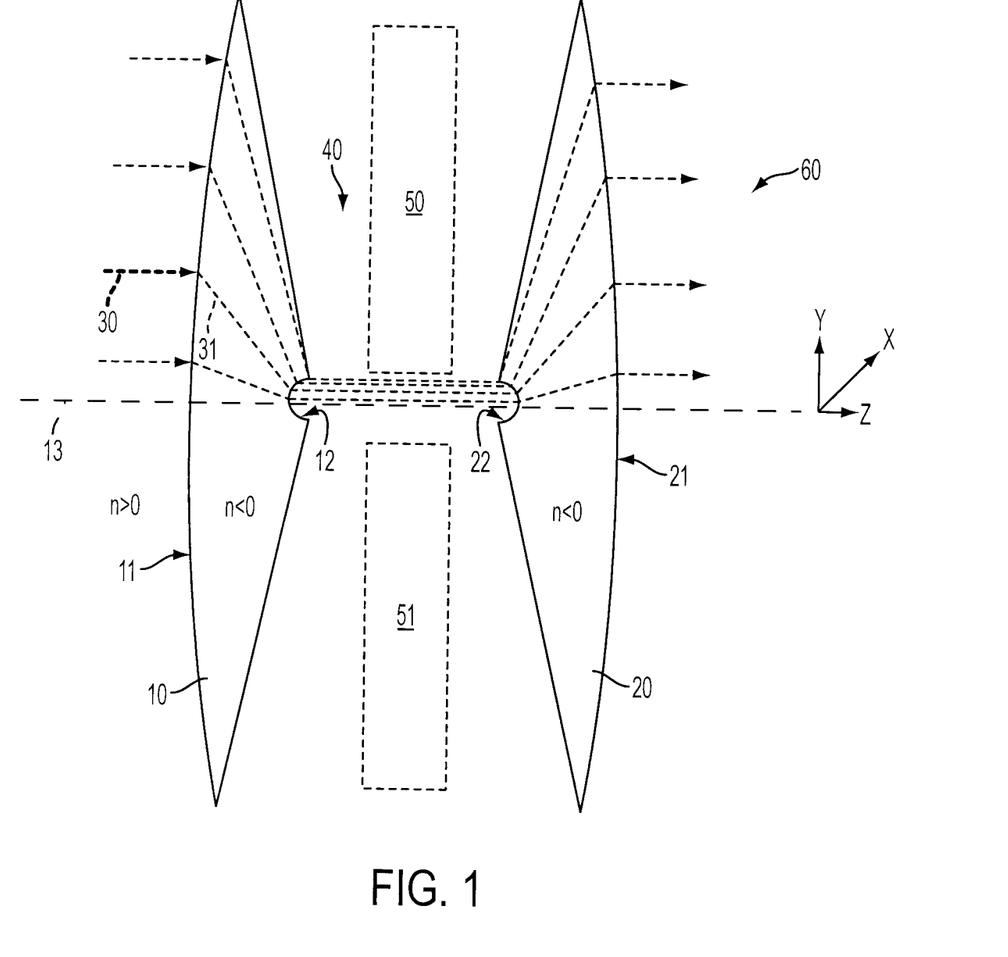
FIG. 1 illustrates a lens system in accordance with an embodiment of the invention.

FIG. 1 is an illustration for explaining a first embodiment of the present invention.

Lenses 10 and 20 are formed of a negative index of refraction material or a material with an index of refraction that is tunable through both positive and negative values. Lens 10 has two curved surfaces 11 and 12. Lens 20 has two curved surfaces 21 and 22.

In the exemplary embodiment of FIG. 1, the curved surface 11 of the lens 10 is convex and is a rotational hyperboloid with its rotational axis 13 on the Z axis, and the curved surface 12 is concave and is a rotational hyperboloid in shape. The second lens 20 has a concave curved surface 21 that is a rotational hyperboloid with its rotational axis colinear with the axis of rotation of the first lens 10. The curved surface 22 is concave and hyperbolic. The concave hyperbolic surfaces 12 and 22 each have an axis of symmetry that is aligned with the Z axis. The cross section illustrated in the figure can be a 2-dimensional or a 3-dimensional structure.

Slight eccentricities in the surfaces of the lenses can be present. Further, the curved surfaces 11 and 21 can be parabolic surfaces that approximate the curvature of a hyperbola.

It is preferred that the absolute value of the index of refraction lenses 10 and 20 be close to the index of refraction of the surrounding environment to reduce reflectivity and diffraction effects. For example, in air or vacuum, the lenses 10 and 20 should have an index of refraction of about negative one. The negative index of refraction can be somewhat greater or lesser than negative one.

Figure 2A:
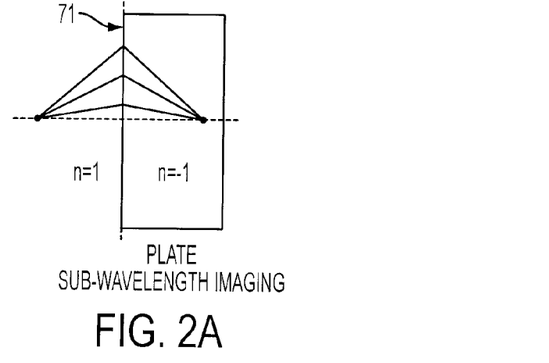
FIGS. 2A, 2B, and 2C illustrate plane wave radiation incident on a planar surface, a spherical surface, and a hyperbolic surface of a negative index of refraction material.
Figure 2B:
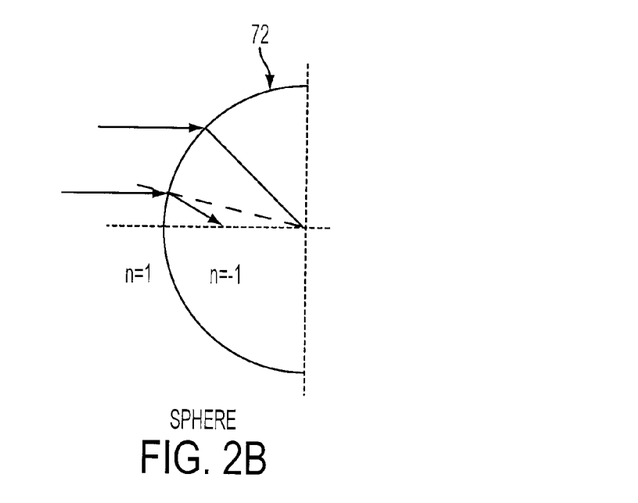
Figure 2C:
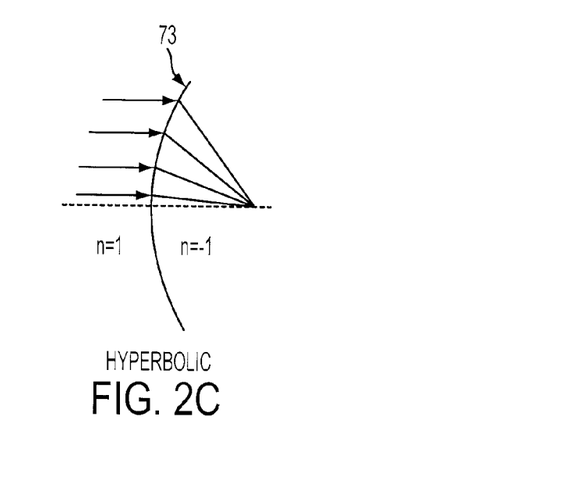

FIG. 2A-2C illustrates the paths photons travel through a negative index of refraction material structures. Here, a plane wave is illustrated as a number of parallel rays. As the plane wave travels from an n=+1 material through the planar surface 71 of a plate of n=-1 material, the rays focus at a point (FIG. 2A). As seen in FIG. 2B, parallel rays traveling from a n=+1 material through a spherical or cylindrical surface 72 of n=-1 material will not focus at a point. The focus is spread across a line or plane bisecting the sphere or cylinder. As the plane wave travels from a n=+1 material through a hyperbolic surface 73 of a n=-1 material, the rays will meet at a point.

Figure 3:
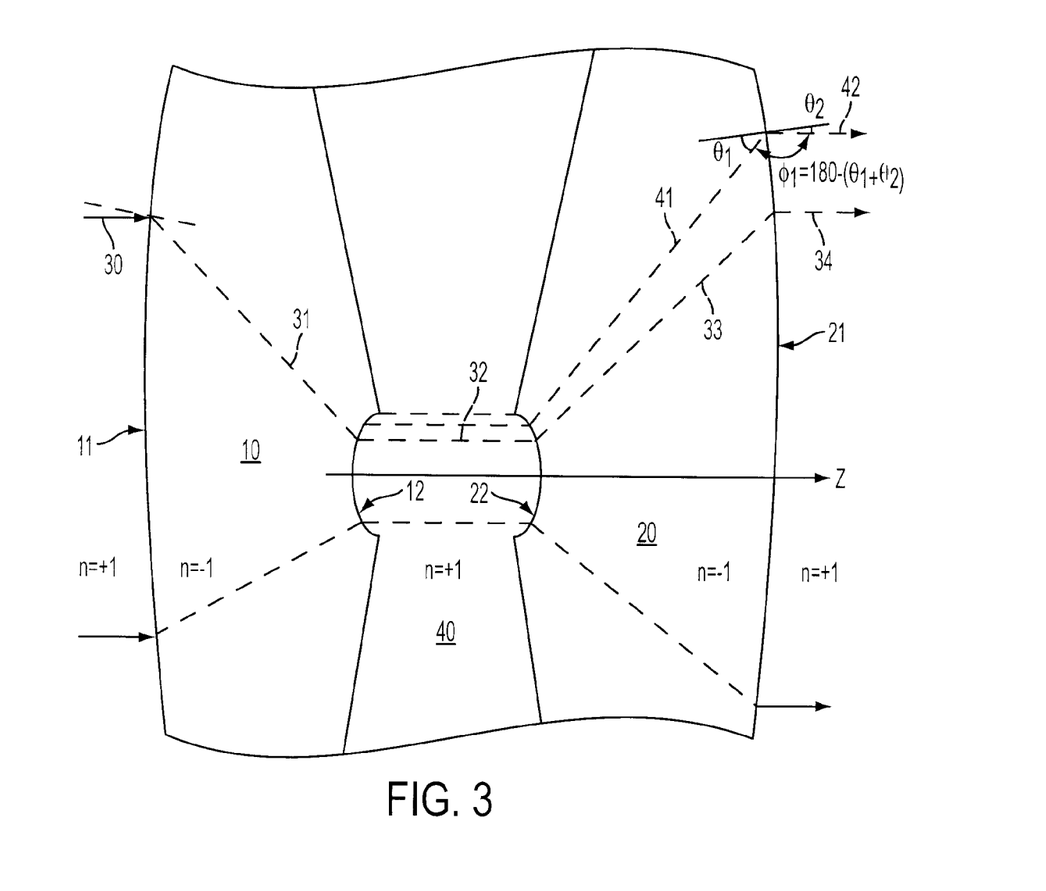
FIG. 3 is an expanded view of a portion of the FIG. 1 lens embodiment.

FIG. 3 is an expanded view of the central portion of the structure 10. As illustrated in FIG. 3, structure 10 comprises a material with a negative index of refraction or a tunable index of refraction that can take on a negative value. The hyperbolically shaped surface 11 refracts the incident far field electromagnetic radiation toward the hyperbolically shaped surface 12. The surface 12 transmits the electromagnetic radiation out of the structure 10 and into a region 40 with a positive index of refraction. The hyperbolic interface 12 between the negative index of refraction material 10 and the positive index of refraction region 40 bends the radiation so it leaves the surface 12 in a direction Z parallel to the direction of the far field incident radiation 30.

In an exemplary embodiment, the hyperbolas that define the curvature of the surfaces 11 and 12 have a common major axis Z.

In this exemplary embodiment, the hyperbolic surface 22 of the second lens is aligned with the hyperbolic surface 12 of the first lens 10 along a common major axis Z. The radiation 32 that leaves the hyperbolic surface 12 of the first lens 10 and travels along a relatively narrow path between the lenses 10 and 20, arriving at the hyperbolic surface 22 of the second lens 20.

The hyperbolic surface 22 of the second lens is an interface between the positive index of refraction region 40 and the negative index of refraction lens 20. The hyperbolic surface 22 refracts the radiation away from the centerline Z toward the hyperbolic surface 21 of the second lens 20. The hyperbolic surface 12 between the negative index lens 20 and the positive index of refraction region 60 refracts the radiation so it leaves the lens 20 as a plane wave traveling in the same direction as the original incident radiation 30.

The hyperbolic interface between the positive index of refraction region and the negative index of refraction region bends the light through very large angles. The angle between the incident radiation and the refracted radiation can be greater than 90 or 100 degrees, and can be about 120 degrees. For example, ray 41 exits the negative index material 20 into the positive index material 60 and is refracted through an angle $\phi$, where $\phi$ is equal to $180-(\theta 1+\theta 2)$ and $\theta 1$ and $\theta 2$ are the angles the rays form with a normal line drawn through the hyperbolic interface 21 between the two regions. Similarly large refraction angles are present at the hyperbolic interfaces 11, 12, and 22 between negative index lenses and the surrounding positive index regions. The large angles of refraction allow the entire lens system to be very compact in the z direction and are not possible with a similar lens system made using a positive index of refraction.

Radiation transmitted through the lenses 10 and 20 system will be transmitted without inversion.

Figure 4:
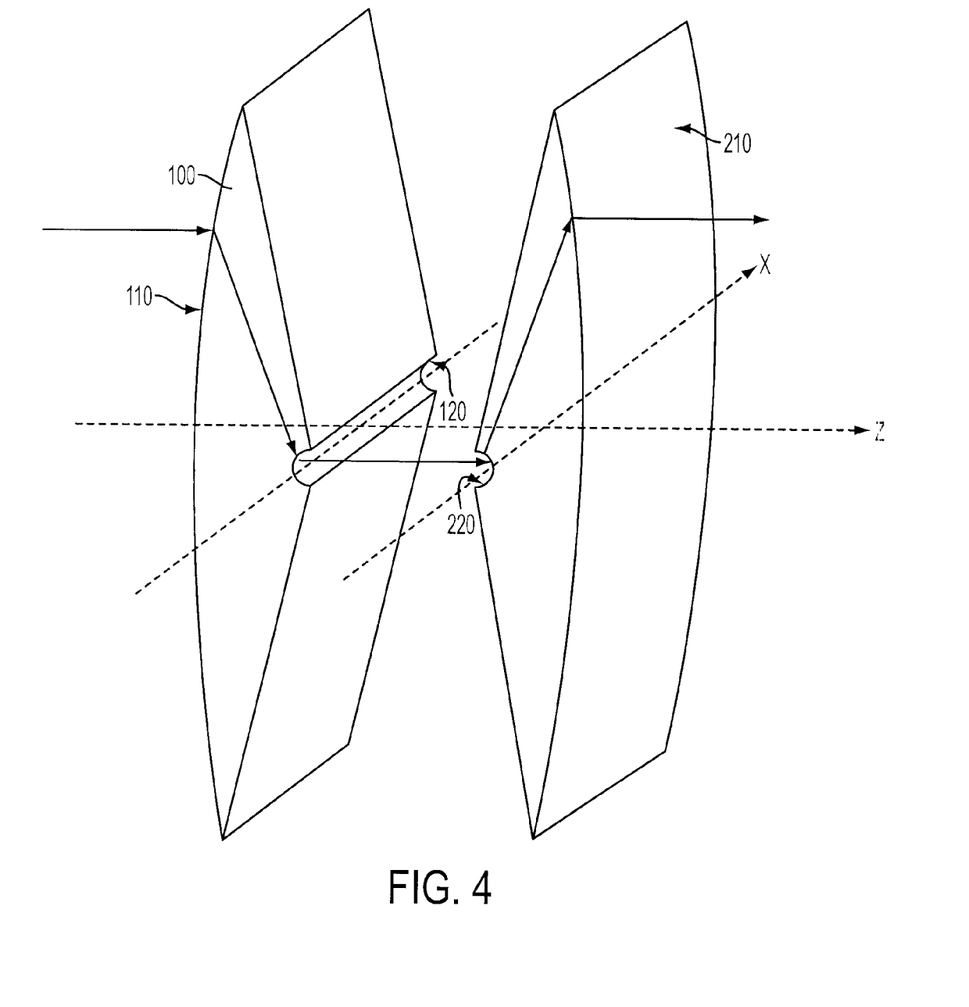
FIG. 4 illustrates a lens system in accordance with an embodiment of the invention.

In another exemplary embodiment, the lenses can be two dimensional, by having a constant cross section in a direction perpendicular to the Z axis. For example, in FIG. 4, the negative index of refraction lens 100 has a curved surface 110 being a hyperbola and a curved surface 120 being a hyperbola. The negative index of refraction lens 200 has a curved surface 210 being a hyperbola and a curved surface 220 being a hyperbola.

Figure 5A:
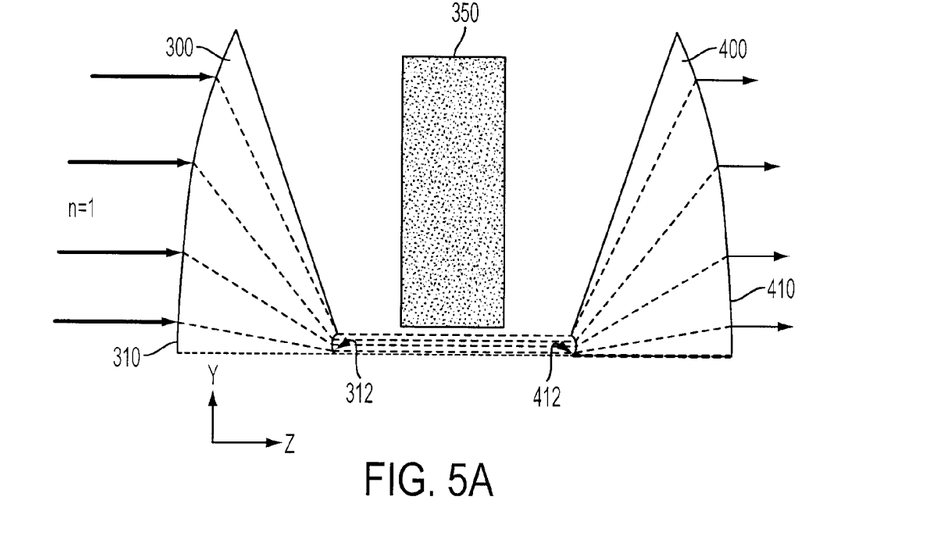
FIGS. 5A, 5B, and 5C illustrate a lens system in accordance with an embodiment of the invention.

FIG. 5A illustrates a cross sectional view of an exemplary embodiment of the invention. As seen in FIG. 5A, the lenses 300 and 400 have hyperbolic surfaces 310, 312, 410 and 412 that are formed by a hyperbolic surface that extends from the centerline of the hyperbola in only one y direction. Thus, the lenses correspond to only the upper half of the lenses shown in FIG. 1. The incoming radiation is guided by the negative index material of the lens so it travels through the path between the hyperbolic surfaces 312 and 412. Thus, the radiation is guided around the object 350 along the path between the curved surfaces 312 and 412.

Figure 5B:
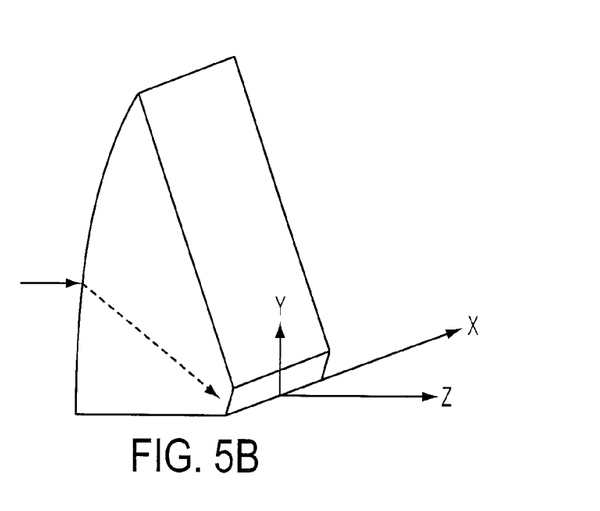
Figure 5C:
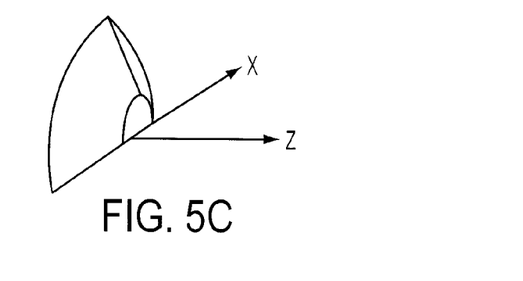

Note that the lens system of FIG. 5A can be three dimensional with rotational hyperboloid surfaces including an arc of 180 degrees, as shown in FIG. 5C. The lens system can also be two dimensional, as shown in FIG. 5B, with the lenses having a constant cross section in the x direction.

The lenses shown in FIGS. 1, 3, 4, and 5 can be arranged with the region between the concave surface of the first and second lenses being vacuum, air, gas, or another material having a positive index of refraction of about one. However, other lenses or waveguide elements for focusing, aligning, or guiding electromagnetic radiation can be positioned along the path between the two lenses. These elements can compensate for NIM lenses with major axes that are somewhat offset from each other.

In an embodiment in which the negative index of refraction of the lens material is near negative one and the optical impedance is near positive one, the reflection and edge diffraction properties of the curved surfaces of the NIM lenses will approach zero. As a result, the optical response of the systems in FIGS. 1, 3, 4, and 5 will be very close to transparent in the far field.

Using FIG. 1 as an example, note that if objects 50 and 51 are located between the lenses 10 and 20 but outside the narrow optical path between the two hyperbolic surfaces 12 and 22, little or no incident radiation 30 will reach the objects 50 and 51. The entire system (lenses 10 and 20 with the objects 50 and 51) will appear to be transparent or unobservable to far-field radiation in the operational frequency range of the lenses. The image of an object on a far side of the lens system will appear to be non-inverted to a viewer/sensor on the opposite side of the lens system.

If the negative index lenses 10 and 20 are not present, incident photons strike the surface of the objects 50 and 51 and are reflected or absorbed by the objects. Thus, the hyperbolic-spherical surfaced negative index of refraction double lens structure can bend the photons around the edges of the object 50, causing normally non-transparent objects 50 and 51 to appear transparent.

It should be noted that parallel light striking surface 21 will trace a path back to surface 11 and leave the lens system non-inverted and anti-parallel to the direction of 30 making the lens system bi-directional.

As is apparent from FIG. 1, the single lens 10 receives far field electromagnetic radiation at the hyperbolic surface 11, and transmits the condensed non-inverted radiation out of the spherically shaped surface 12, along the original path of the incident radiation. In other embodiments, a single lens 10 or 20 can be used alone to expand or condense electromagnetic radiation without inversion. Similarly, far field radiation received by the lens 10 at the spherical surface 12 will be expanded by the lens without inversion.

Some suitable negative index of refraction materials are described in U.S. Patent Publication No. 20070242360 (Ser. No. 11/279,460) to Rachford, U.S. Pat. No. 7,253,696 to Krowne, the metallic split ring resonator metamaterial structures described in U.S. Pat. No. 6,791,432 to Smith, the entire disclosures of which are incorporated herein in their entireties.

In an exemplary embodiment, the lenses comprise a switchable or tunable material that can take on either negative or positive values. The lenses can comprise materials and structures whose operational frequency is tunable. Examples of suitable materials include the photonically controlled metamaterials discussed in U.S. patent application Ser. No. 11/559,535 to Tonucci and U.S. patent application Ser. No. 11/559,508 to Tonucci, both of which are incorporated by reference in their entireties. When the lenses have a positive index of refraction, far field radiation will not be bent away from the object. When the lenses are switched to a negative index of refraction, far field radiation will be bent around the object through the narrow path between the curved surfaces 12 and 22.

The negative index material lens structure can include a number of semiconductor substrates, at least one resonant element disposed on the substrate arranged to induce a negative permeability at the operational frequency, and at least one strip line element disposed on the substrate for inducing a negative permittivity in the frequency range. At least one of the substrate, the strip line element, and the resonant element includes a photoconductive semiconductor material. Switching the structure between a positive effective index of refraction value and a negative effective index of refraction can be accomplished by the photoconductive semiconductor material receiving above band-gap photons at an excitation frequency.

The negative index lens structure can be a photoconductive semiconductor wafer, the wafer operable to receive above band-gap photons at an excitation frequency in an excitation pattern on a surface of the wafer, the excitation patterns generating an effective negative index of refraction. The operational frequency is tuned by changing the projected pattern in real time.

The negative index lens structure can be semiconductor substrate, at least one resonant element disposed on the substrate arranged to induce a negative permeability at a below band-gap operational frequency, and at least one strip line element disposed on the substrate arranged to induce a negative permittivity at the operational frequency. At least one of the substrate, the strip line element, and the resonant element comprises a photoconductive semiconductor material. The photoconductive semiconductor material receives above band-gap photons at an excitation frequency. Changing the amount of above band-gap photons at an excitation frequency results in a change in the index of refraction of the structure.

The first lens material comprises a photoconductive semiconductor and a plurality of strip line elements and resonant elements. The resonant elements can be split ring resonators. The resonant element and the strip line element can be disposed on opposite faces of a substrate. The strip line elements and the resonant elements can include a photoconductive semiconductor material. The strip line elements and the resonant elements can include both a photoconductive semiconductor material and metal.

Other negative index materials are also suitable.

The "frequency range of operation" or "operational frequency range" is the frequency range over which elements of the metamaterial can take on a negative value of the index of refraction. In an exemplary embodiment, the frequency range of operation is in a microwave band. More specifically, the frequency range of operation can be about 10 MHz to about 200 GHz, or greater or lesser. Other ranges of operational frequencies, including infrared and visible, are possible, depending on the negative index of refraction materials used.

For photonically excited metamaterials described in U.S. patent application Ser. No. 11/559,535 to Tonucci and U.S. patent application Ser. No. 11/559,508 to Tonucci, the "excitation frequency" is the above band-gap frequency at which photons are applied to excite a metamaterial structure. The excitation frequency will typically be above the band-gap and the operational frequency range will be below the exciting frequency and below the band-gap of the metamaterial. For microwave operational frequencies, the excitation frequency can be in the ultraviolet, visible or near IR frequency bands.

The term "lens" as used herein is not limited to materials that are transparent to optical wavelengths of electromagnetic radiation. As used herein, "lens" is a device that transmits and refracts electromagnetic radiation in any electromagnetic wavelength range.

For embodiments in which resonators contribute to the negative index of refraction, the size of the lens should be large enough to include sufficient resonant elements to achieve the desired effective index of refraction at the operational frequency range. In embodiments in which the lenses are arranged on either side of an object, as in FIGS. 1 and 5, the lenses are sized to extend beyond the edge of the object in an outward direction from the axis Z.

Note that the lenses 10 and 20 are illustrated as separate from the objects 50 and 51 in FIG. 1. Embodiments of the invention also include lenses in contact with or affixed to the objects or structures themselves. The lens pairs in the lens system can also be fixed to each other, or can be integrally formed.

Note that although the lens systems described herein can include additional optical elements with a positive or negative index of refraction, such elements are not required. It is envisioned that the negative index lenses can be positioned directly in a vacuum, in air, in another gaseous environment, in contact with an environment having an index of refraction of about positive one. When the lenses have a negative index of refraction that is matched to the index of refraction of the surrounding environment, reduce reflectivity and diffraction effects will be minimized.

As discussed above, the objects 50 and 51 may be passive elements whose presence or position is desired to be hidden from detection at the operational frequency range.

Alternatively, the objects 50 and 51 can be active elements, such as microwave transmitters or receivers operating at frequencies outside the operational frequencies of the lens system. Active elements can 50 and 51 can also operate at frequencies far beyond the operational frequency of the lens system. Lens systems with operational frequencies in the microwave can have active elements that operate at kilohertz, terahertz, infrared and optical frequencies.

Figure 6:
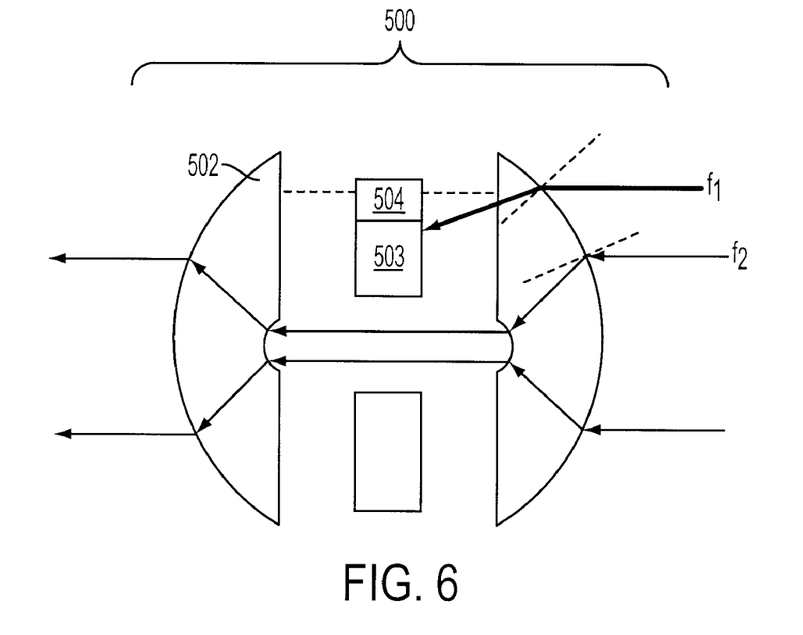
FIG. 6 illustrates a lens system with an active object arranged between the lenses.

FIG. 6 illustrates a lens system 500 with first and second lenses as described above. An active object 503 is located between the first and second lenses but outside the optical path between the concave surfaces of the first and second lenses. The lens system 500 has an operating frequency range in which the material of the lenses has a negative index of refraction. The lenses 501 and 502 are transmissive with a positive index of refraction for frequencies outside the operating frequency range. Far field radiation at a frequency $f_2$ that is in the operational frequency range will pass through the lens system without reaching the active object 503. Only radiation at frequencies outside the operational frequency range (e.g., frequency $f_1$ in FIG. 6) reaches the active object 503.

The active device 503 can be a system that senses radiation and accomplishes an action in response. As one example, the device can be a microwave receiver, a transceiver that responds when it receives a signal, or another device.

U.S. patent application Ser. Nos. 11/559,535 and 11/559,508 to Tonucci disclose negative index of refraction materials with tunable operational frequencies. Such tunable materials can be applied to the lens systems described herein, for example, in a frequency tracking system shown in FIG. 6. In operation, the lens system operates as discussed above, transmitting farfield electromagnetic radiation in its operational frequency range through the system without reaching the receiver 503 that is arranged between the lenses but outside the optical path between the lenses. If electromagnetic radiation reaches the receiver 503, the receiver detects that electromagnetic radiation is present at a frequency outside the system's current operational frequency band. In an exemplary embodiment, the receiver signals a controller 504, which then changes the operational frequency of the lens system to include the newly detected frequency. Similarly, the controller 504 can be used to turn the lens system's negative index of refraction properties on or off at a particular operational frequency.

The negative index of refraction lens systems described herein can also incorporate adaptive optics, such as a changeable index of refraction. In such an embodiment, the system can change the index of refraction of portions of the lens system, enabling the system to manipulate or enhance images passing though the lens system. This method can compensate for local aberration in optical devices, clean up an image, or compensate for Schlieren distortion.

In some applications, it is not necessary that the far-field radiation be transmitted through a lens system without much distortion, as long as the radiation does not reach the object 503 and is not reflected back to its farfield source along the line of the incoming radiation or to another detector. In this instance, the system can include only one lens 501 without the second lens 502, or the first lens 501 and a different shape or type of second lens.

Figure 7:
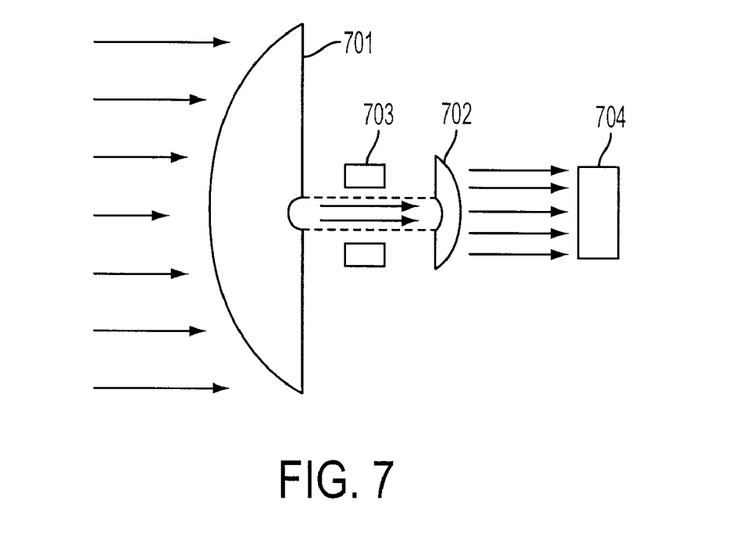
FIG. 7 illustrates a lens system in which the one lens has a much larger diameter than the other lens.

As illustrated in FIG. 7, the first and second lenses in the lens system can be different sizes. In the FIG. 7 illustration, the first lens 701 has a much larger diameter than the second lens 702. When farfield electromagnetic radiation in the operational frequency is incident on the larger lens 701, it passes through and is magnified by the NIM lens system, without reaching the object 703 that is positioned between the lenses. Conversely, if the incident radiation arrives from the opposite direction, radiation incident on the lens 702 will be magnified by the lens system and transmitted through the lens system without reaching the object 703.

One application of the system in FIG. 7 is for viewing large images through a small opening in a barrier such as a wall. A receiver, such as a photodetector or microwave receiver, an eyepiece, or other optical component 704 can be arranged at the far side of the smaller diameter lens 702.

Figure 8A:
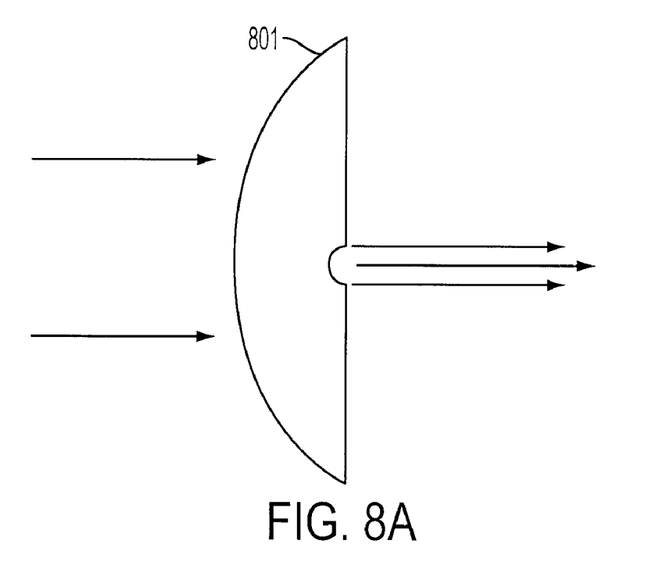
FIGS. 8A and 8B illustrate using the negative index of refraction lenses described herein to steer incident radiation.
Figure 8B:
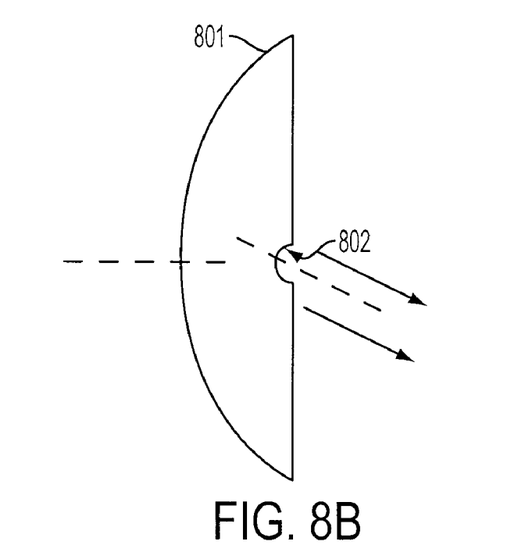

As seen in FIGS. 8A and 8B, the negative index of refraction lenses described herein can also be arranged to steer the radiation in a direction other than along the perpendicular direction by changing the major axis/pointing direction of the smaller concave hyperbolic surface 802 of the negative index lens 801. Steering of an image can also be accomplished by changing the index of refraction of the lenses using the methods disclosed in U.S. patent application Ser. Nos. 11/559,535 and 11/559,508.

U.S. patent application Ser. Nos. 11/559,535 and 11/559,508 also disclose negative index of refraction materials with tunable operational frequencies. Such tunable materials can be applied to the lens systems described herein, for example, in a frequency tracking system shown in FIG. 6. In operation, the lens system operates as discussed above, transmitting farfield electromagnetic radiation in its operational frequency range through the system without reaching the receiver 503 that is arranged between the lenses but outside the optical path between the lenses. If electromagnetic radiation reaches the receiver 503, the receiver detects that electromagnetic radiation is present at a frequency outside the system's current operational frequency band. In an exemplary embodiment, the receiver signals a controller 504, which then changes the operational frequency of the lens system to include the newly detected frequency.

Figure 9:
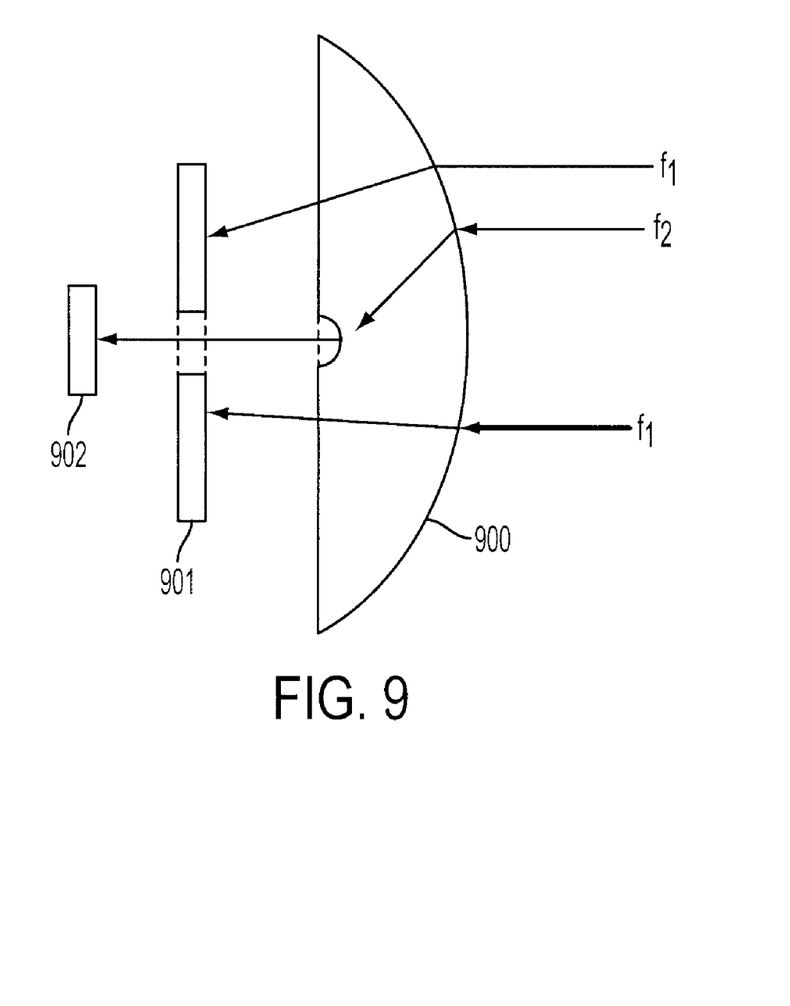
FIG. 9 illustrates a lens system in combination with two receivers that operate at different frequencies.
Figure 10:
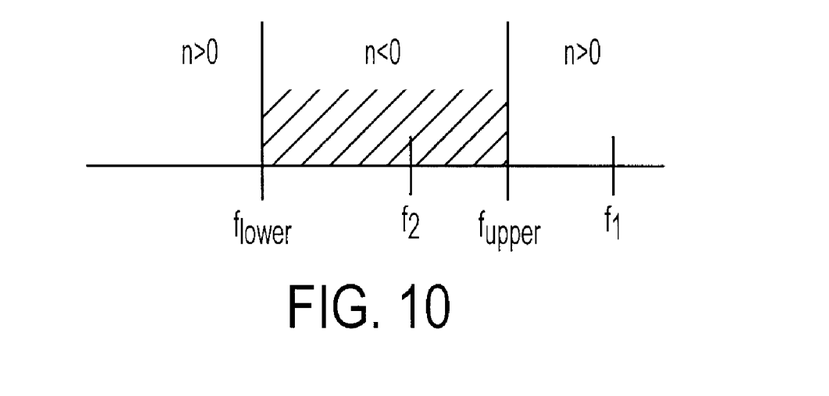
FIG. 10 illustrates the in-band frequency and out-of band frequency for the system of FIG. 9.

The negative index of refraction lenses described herein can also be used as optical components to filter or separate electromagnetic radiation at different frequencies or to as filters to pass radiation from one region to another without absorption. FIG. 9 illustrates an embodiment of an invention in which two receivers are arranged with a first receiver 901 arranged in front of the second receiver 902. As shown in FIG. 10, the lens has an operational range that includes the frequency $f_2$, but which does not include the frequency $f_1$. The lens has a negative index of refraction for incident electromagnetic radiation within the operational frequency band, and bends the electromagnetic radiation around the first receiver 901. This system configuration minimizes the effect the out-of-band frequency $f_2$ has on the first receiver and the effect the in-band frequency $f_1$ has on the second receiver. Only the in-band frequencies reach the second receiver 902. Although only one receiver is shown in FIG. 9, arrays of receivers can also be arranged in parallel or in series.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. A lens system comprising:
    a first lens, the first lens formed of material having a negative index of refraction in an operational frequency range, the negative index of refraction material having
    a first surface having a convex hyperbolic curvature,
    a second surface having a concave hyperbolic curvature; and
    a second lens formed of material having a negative index of refraction in an operational frequency range, the negative index of refraction material having
    a first surface having a convex hyperbolic curvature,
    a second surface having a concave hyperbolic curvature,
    wherein the concave hyperbolic surfaces of the first lens and the second lens face each other.

2. The lens system according to claim 1, wherein plane waves incident on the first surface of the first lens are bent toward the second surface of the first lens.

3. The lens system according to claim 1, wherein the negative index of refraction is about negative one.

4. The lens system according to claim 1, wherein the concave hyperbolic curvature of the second surface of both the first and second lenses have an approximately constant cross section in a direction perpendicular to the major axis of the hyperbola.

5. The lens system according to claim 1, wherein each of the concave and convex surfaces has a rotational hyperbolic shape.

6. The lens system according to claim 1, wherein the index of refraction of the first lens is tunable from positive to negative.

7. The lens system according to claim 1, wherein the operational frequency is tunable.

8. The lens system according to claim 1, wherein the first lens material comprises a photoconductive semiconductor material.

9. The lens system according to claim 1, wherein the first lens includes a plurality of strip line elements and resonant elements.

10. The system according to claim 9, wherein the resonant elements are split ring resonators.

11. The system according to claim 9, wherein said plurality of resonant elements and said plurality of strip line elements are disposed on opposite faces of a substrate.

12. The system according to claim 9, wherein the strip line elements and the resonant elements comprise a photoconductive semiconductor material.

13. The system according to claim 9, wherein the strip line elements and the resonant elements comprise a photoconductive semiconductor material and metal.

14. The system according to claim 1, wherein plane waves in the operational frequency range incident on the convex hyperbolic surface of the first lens are bent toward the concave hyperbolic surface of the first lens, are transmitted from the concave hyperbolic surface of the first lens to the concave hyperbolic surface of the second lens, are bent toward the convex hyperbolic surface of the second lens, and are emitted from the convex hyperbolic surface of the second lens.

15. The system according to claim 14, wherein the plane waves are bent around an object positioned outside an optical path between the concave hyperbolic surfaces of the first and second lenses.

16. The system according to claim 15, wherein the object is a receiver responsive to electromagnetic radiation at frequencies outside the operational frequency range.

17. The system according to claim 16, further comprising a controller for changing the operational frequency range of the lens system to include a frequency received by the receiver.

18. The system according to claim 15, wherein the system transmits the plane waves through the system without absorption.

19. The system according to claim 1, wherein the system acts as a filter to pass radiation in the operational frequency range through the lens system without absorption.

20. The system according to claim 1, wherein the first lens has a diameter larger than the diameter of the second lens.

21. A lens system comprising:
    a lens formed of material having a negative index of refraction in an operational frequency range, the negative index of refraction material having
    a first surface having a convex hyperbolic curvature, and
    a second surface having a concave hyperbolic curvature, the first surface and the second surface having a common major axis;
    a first receiver; and
    a second receiver, with the first receiver positioned between the lens and the second receiver,
    wherein the lens bends electromagnetic radiation at frequencies within the operational frequency range around the first receiver and toward the second receiver, and transmits electromagnetic radiation at frequencies outside the operational frequency range to the first receiver.

* * * * *